(12) United States Patent
Choi

(10) Patent No.: US 10,464,144 B2
(45) Date of Patent: Nov. 5, 2019

(54) PIPE CUTTING AND BEVELING MACHINE

(71) Applicant: DCSENG CO., LTD., Chungcheongbuk-do (KR)

(72) Inventor: Insung Choi, Daejeon (KR)

(73) Assignee: DCSENG CO., LTD., Chungcheonbuk-Do (KR)

( * ) Notice: Subject to any disclaimer, the term of this patent is extended or adjusted under 35 U.S.C. 154(b) by 0 days.

(21) Appl. No.: 16/081,195

(22) PCT Filed: Mar. 30, 2017

(86) PCT No.: PCT/KR2017/003522
§ 371 (c)(1),
(2) Date: Aug. 30, 2018

(87) PCT Pub. No.: WO2017/171453
PCT Pub. Date: Oct. 5, 2017

(65) Prior Publication Data
US 2019/0022773 A1 Jan. 24, 2019

(30) Foreign Application Priority Data
Apr. 1, 2016 (KR) .................. 10-2016-0040024

(51) Int. Cl.
*B23C 3/12* (2006.01)
*B23C 1/12* (2006.01)
(Continued)

(52) U.S. Cl.
CPC ............ *B23C 3/122* (2013.01); *B23B 5/163* (2013.01); *B23C 1/12* (2013.01); *B23C 3/12* (2013.01);
(Continued)

(58) Field of Classification Search
CPC ............ Y10T 409/30644; Y10T 82/22; Y10T 29/5199; B23C 3/122; B23B 5/163;
(Continued)

(56) References Cited

U.S. PATENT DOCUMENTS 2,917,976 A * 12/1959 Stovall .................. B23B 5/16
409/179
3,130,524 A * 4/1964 Nelson .................. B23D 47/08
451/25

(Continued)

FOREIGN PATENT DOCUMENTS

CH 618370 A * 7/1980
CN 103192135 A 7/2013
(Continued)

OTHER PUBLICATIONS

Machine Translation of DE 102004031756 A1, which DE '756 was published Jan. 2006.*
(Continued)

*Primary Examiner* — Erica E Cadugan
(74) *Attorney, Agent, or Firm* — RatnerPrestia

(57) ABSTRACT

A machine for cutting or beveling a pipe. A cutter unit rotates around the pipe while cutting any surface of the pipe after gripping and fixing the pipe. The machine includes: a main body which a pipe passes through the center portion thereof to be fixed; and a cutter unit coupled to the main body unit rotates around the fixed pipe to cut or bevel the pipe. The cutter unit may have a rotating unit on one side to pull the cutter unit aside and a locking unit on the other side to restrain or release the cutter unit. An entry control unit operating the cutter unit includes: a lever gear-engaged with an outer side surface of an entry control plate; and a clutch
(Continued)

formed on a rotation shaft of the lever such that the restraint is released when the lever is lifted or pressed in the axial direction.

7 Claims, 7 Drawing Sheets

(51) Int. Cl.

| | | |
|---|---|---|
| *B23Q 9/02* | (2006.01) | |
| *B23P 23/02* | (2006.01) | |
| *B23D 21/04* | (2006.01) | |
| *B26D 3/16* | (2006.01) | |
| *B23B 5/16* | (2006.01) | |
| *B23Q 9/00* | (2006.01) | |
| *B23D 33/02* | (2006.01) | |
| *B26D 7/02* | (2006.01) | |
| *B26D 7/20* | (2006.01) | |
| *B26D 7/26* | (2006.01) | |

(52) U.S. Cl.
CPC ............ *B23D 21/04* (2013.01); *B23D 33/02* (2013.01); *B23P 23/02* (2013.01); *B23Q 9/0035* (2013.01); *B26D 3/16* (2013.01); *B26D 7/02* (2013.01); *B26D 7/20* (2013.01); *B26D 7/26* (2013.01); *B26D 7/265* (2013.01); *B23B 2215/72* (2013.01); *Y10T 29/5199* (2015.01); *Y10T 82/22* (2015.01); *Y10T 409/30644* (2015.01); *Y10T 409/304144* (2015.01); *Y10T 409/308512* (2015.01)

(58) Field of Classification Search
CPC .. B23Q 9/0021; B23Q 9/0035; B23Q 9/0057; B23D 79/021; B23D 21/04; B24B 27/0616; B26D 3/16
USPC .................. 409/179; 82/113; 30/97, 96, 95; 29/33 T
See application file for complete search history.

(56) References Cited

U.S. PATENT DOCUMENTS

| | | | | |
|---|---|---|---|---|
| 3,942,248 A | * | 3/1976 | Sherer | B23D 21/02 30/97 |
| 4,129,062 A | * | 12/1978 | Bergmann | B23D 79/021 409/140 |
| 4,180,358 A | * | 12/1979 | Uribe | B23B 5/16 409/179 |
| 5,159,756 A | * | 11/1992 | McGuire | F16L 41/06 30/92 |
| 7,252,025 B2 | * | 8/2007 | Place | B23B 3/26 82/101 |
| 7,677,846 B2 | * | 3/2010 | VanderPol | B23C 3/122 228/13 |
| 7,914,243 B2 | * | 3/2011 | VanderPol | B23C 3/122 409/140 |
| 2009/0116914 A1 | * | 5/2009 | Rieth | B23C 3/007 408/104 |

FOREIGN PATENT DOCUMENTS

| | | | |
|---|---|---|---|
| DE | 102004031756 A1 | * | 1/2006 |
| EP | 895837 A2 | * | 2/1999 |
| FR | 2253614 A1 | * | 7/1975 |
| FR | 2802134 A1 | * | 6/2001 |
| JP | 52-036391 A | * | 3/1977 |
| JP | 06023383 Y2 | | 6/1994 |
| JP | 2010115747 A | | 5/2010 |
| KR | 1019970014865 A | | 4/1997 |
| KR | 1020090101426 A | | 9/2009 |
| KR | 101415513 B1 | | 7/2014 |

OTHER PUBLICATIONS

Machine Translation of CH-618370-A, which CH '370 was published Jul. 1980.*
International Search Report issued in PCT/KR2017/003522, dated Jul. 28, 2017, 5 pages.
Chinese Office Action for Chinese Application No. 201780015486.8, dated Jul. 24, 2019, with translation, 13 pages.

* cited by examiner

PRIOR ART

PIPE CUTTING AND BEVELING MACHINE

CROSS REFERENCE TO RELATED APPLICATIONS

This application is the U.S. National Phase Application of PCT/KR2017/003522, filed Mar. 30, 2017, which claims priority to Korean Patent Applications 10-2016-0040024, filed Apr. 1, 2016 and 10-2016-0086348, filed Jul. 7, 2016.

TECHNICAL FIELD

The present disclosure relates to a machine capable of cutting or beveling a pipe, a circular pipe material, a rod material, or the like, by fixedly fastening the pipe, and then causing a cutter unit to turn around the pipe while cutting one surface of the pipe.

BACKGROUND ART

In the piping facility industry, the technique of cutting a pipe or cutting and then beveling a pipe is one of the processes as important as a welding technique. In the past, gas cutting machines, saw machines and the like were used for pipe cutting and beveling. However, in recent years, as dedicated machines have been distributed, quality, workability, and productivity have been improved.

As illustrated in FIG. 1, a dedicated pipe cutting and beveling machine, which is currently distributed, includes a main body 2 configured to allow a pipe to pass therethrough and having a plurality of jaws 3 coupled so as to fix the pipe passing through the main body, a rotary plate 4 coupled to one side surface of the main body 2 and configured to orbit around the fixed pipe, and a cutter unit 8 coupled to the rotary plate and configured to cut the pipe. At this time, the cutter unit 8 is mounted on an entry adjustment plate 6 hinged to a point on the rotary plate 4 so as to pivot such that a cutting blade 9 is capable of entering toward or retreating from a cutting portion on the fixed pipe. Further, the pipe cutting and beveling machine includes an entry control unit 7 configured to move the entry adjustment plate 6 and a rotation control unit 5 configured to move the rotary plate 4.

The dedicated pipe cutting and beveling machine of the prior art configured as described above causes the rotary plate 4 to orbit one turn while cutting a portion of the pipe by the cutting blade 9, thereby cutting the pipe, or is capable of beveling the pipe by being equipped with a chamfering blade instead of the cutting blade.

The dedicated pipe cutting and beveling machine of the prior art has a structure in which the cutter unit 8 is separated from the entry adjustment plate 6 in order to replace the cutting blade or the chamfering blade. In order to prevent the cutter unit 8 from being inadvertently separated after being mounted, the dedicated pipe cutting and beveling machine has a structure in which the cutter unit 8 is inserted from the center to the outer peripheral edge side of the entry adjustment plate 6 in a slot type by a guide.

However, the cutter unit mounting structure described above has no problem in the standby state or in the state of preparing pipe cutting, but has a serious inconvenience in that it is necessary to remove the cutter unit in order to replace the cutting blade or the chamfering blade. A cutting blade replacing structure according to the prior art is briefly described. As illustrated in FIG. 2, the cutter unit 8 is configured to be separated from the entry adjustment plate 6 of the main body. At this time, in order to fix the cutter unit 6 tightly so as not to wobble, the cutter unit 6 is provided at the tip thereof with a concavo-convex-type mounting portion 11 such as a protrusion and a groove, and a concavo-convex-type guide 12 is also provided on the entry adjustment plate 8 corresponding to the cutter unit 6. Since the mounting unit 11 and the guide 12 have a structure of being coupled in a vertical slit type, so that they are configured to be inserted from above and fitted down.

Thus, in order to replace the cutting blade, it is necessary to lift the cutter unit 6. However, since the pipe p is fixed to the central portion of the rotary plate, the pipe p interferes with lifting the cutter unit 6. Thus, the replacement of the cutting blade is performed in the following order: ① extracting the pipe, ② separating the cutter unit, ③ replacing the cutting blade from the separated cutter unit, ④ coupling the cutter unit again, and ⑤ fixing the pipe again. Therefore, in order to replace the cutting blade or the chamfering blade in the course of performing a work or in order to perform other work, it is necessary to remove the cutter unit in order to replace the cutting blade or the chamfering blade, which leads to a problem that the work efficiency and productivity are lowered.

On the other hand, there are problems in that the entry control unit 7 configured to cause the cutter unit 8 to enter or retreat to or from the pipe p side is not finely tuned after setting, that there occurs a phenomenon in which the entry adjustment plate 6 is slipped by the cutting load of the cutter unit 8, and that the proper fastening pressure of the entry adjustment plate 6 is not adjusted, and thus serious vibration is generated by the cutting blade.

That is, the operation method of the entry control unit 7 includes releasing a fastening tool 14, arbitrarily moving the entry adjustment plate 6 such that the cutting blade of the cutter unit 8 reaches a pipe cutting position, tightening the fastening tool 14 again to fix the entry adjustment plate 6 such that the entry adjustment plate is not moved, and turning the entry lever 13 downward so as to seat the entry lever 13 on the entry fixing pin (not illustrated). However, when there is an error in setting, it cannot be corrected in the set state, and it is necessary to perform the setting from the beginning again.

Since the entry adjustment plate 6 is fixed by the simple action of tightening or loosening the fastening tool 14, when the cutting load of the cutter unit 8 is slightly increased, there occurs a phenomenon in which the entry adjustment plate 6 slides from the fastening tool 14, which makes precise machining impossible.

In addition, the entry control unit 7 configured to control the entry adjustment plate 6 should have a proper clearance with the rotation plate 4 in order to smoothly control the entry adjustment plate 6. That is, when a large clearance is generated, a serious vibration is applied to the cutter unit 8 during operation, which significantly reduces the lifespans of equipment and the machining tools. When there is little clearance, a problem occurs in that the entry adjustment plate 6 cannot be controlled. However, a device capable of adjusting such a clearance has not been developed so far.

DETAILED DESCRIPTION OF THE INVENTION

Technical Problem

The present disclosure has been made to solve the above problems, and an aspect of the present disclosure is to provide a pipe cutting and beveling apparatus in which a cutter unit is configured to be tilted to one side in the state of being fixed on an entry adjustment plate, so that a cutting blade or a chamfering blade can be easily and quickly replaced without separating the cutter unit to the outside of the machine and further without removing the pipe even in the state where the pipe is fixed to the machine chamfered blade.

In addition, another aspect of the present disclosure is to provide a pipe cutting and beveling machine capable of easily restraining and releasing an entry adjustment plate while making it possible to finely adjust entry and retreat intervals of an entry control unit configured to cause the cutter unit to enter toward or retreat from the pipe side.

Further, another aspect of the present disclosure is to provide a pipe cutting and beveling machine capable of preventing a clearance from being generated in an entry adjustment plate by allowing a preload to be applied to the entry adjustment plate by an entry control unit.

Technical Solution

In order to solve the problems described above, the present disclosure is capable of providing a pipe cutting and beveling machine including a main body portion having a central portion through which a pipe passes so as to be fixed, and a cutter unit coupled to the main body and configured to cut or bevel the pipe by a cutting blade while orbiting around the fixed pipe, in which the cutter unit is provided with a pivot unit on one side thereof such that the cutter unit is tilted laterally, and the cutter unit is provided with a lock unit on a remaining side thereof so as to restrain or release tilting of the cutter unit.

At this time, the pivot unit may be provided with a stop ball configured to temporarily stop movement of the cutter unit when the cutter unit is tilted, and an upper surface of the latch on which a fastening means of the lock unit is formed to be inclined so as to push the cutter unit not only in a fastening direction, but also toward the pivot unit.

Alternatively, the present disclosure is capable of providing a pipe cutting and beveling machine including a main body portion having a central portion through which a pipe passes so as to be fixed, a cutter unit coupled to the main body and configured to cut or bevel the pipe by a cutting blade while orbiting around the fixed pipe, and an entry control unit configured to move the entry adjustment plate coupled to the cutter unit such that the cutter unit enters toward or retreats from a cut portion in the pipe, in which the entry control unit includes a lever engaged with an outer surface of the entry adjustment plate through gears and a clutch provided on a rotary shaft of the lever so as to be released from restraint when the lever is lifted or pushed in an axial direction.

At this time, units of the entry control unit may be coupled to a gear box, a wedge may be coupled to the gear box such that the wedge is adjustable in depth, and a spring may be embedded in the clutch so as to allow the lever to be elastically lowered.

In addition, the gear of the entry adjustment plate may be formed of a pin gear such that chips can be easily discharged.

Alternatively, the present disclosure is capable of providing a pipe cutting and beveling machine including a main body portion having a central portion through which a pipe passes so as to be fixed, a cutter unit coupled to the main body and configured to cut or bevel the pipe by a cutting blade while orbiting around the fixed pipe, and an entry control unit configured to move the entry adjustment plate coupled to the cutter unit such that the cutter unit enters toward or retreats from a cut portion in the pipe, in which the entry control unit is provided with a cutting position stopper that is rotated toward the cutting position of the pipe in order to set a cutting or beveling point of the pipe.

At this time, the cutting position stopper may be further provided with a stopper plate and a stop adjuster so as to finely adjust the cutting point of the pipe.

Advantageous Effects

Since the pipe cutting and beveling machine according to the present disclosure has a structure in which the cutter unit is tilted laterally, there is an advantage in that the cutting blade can be conveniently and quickly replaced without interfering with the pipe even if the pipe is mounted.

In addition, there are advantages in that the entry control unit configured to enter or retract the cutter unit in order to cut the pipe has a simple structure in which restraint can be easily released by the action of lifting the lever in the axial direction and the pipe can be restrained again by elastic lowering by releasing the lever again, and in that the entry and retreat actions of the cuter unit can be finely adjusted.

In addition, since the entry adjustment plate has a structure which can be applied with a preload, no clearance is generated in the entry adjustment plate, and thus vibration is not generated in the cutting blade, which enables high quality pipe cutting and beveling.

Further, the piping cutting and beveling machine according to the present disclosure has an advantage in that it further includes a beveling stopper that can be rotated toward the cut surface of the pipe, so that during the beveling operation, the cut surface of the pipe can be accurately aligned with the beveling blade.

DETAILED DESCRIPTION

Hereinafter, a pipe cutting and beveling machine according to an embodiment of the present disclosure will be described in detail with reference to the accompanying drawings.

Figure 1:
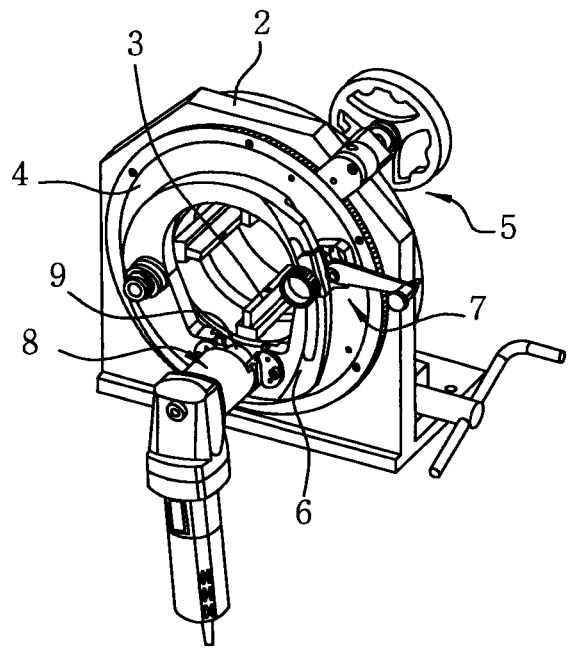
FIG. 1 is a view illustrating a dedicated pipe cutting and beveling machine according to the prior art.
Figure 2:
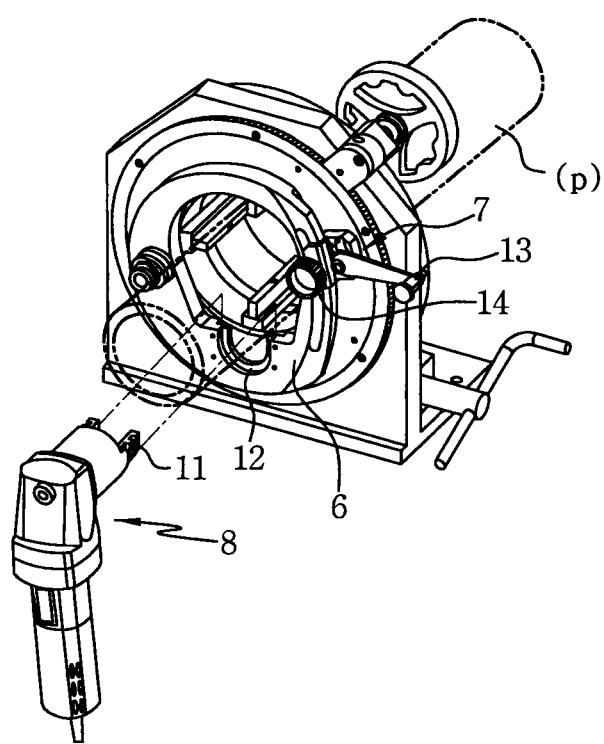
FIG. 2 is a view illustrating a cutter unit separation structure of the dedicated pipe cutting and beveling machine according to the prior art.
Figure 3:
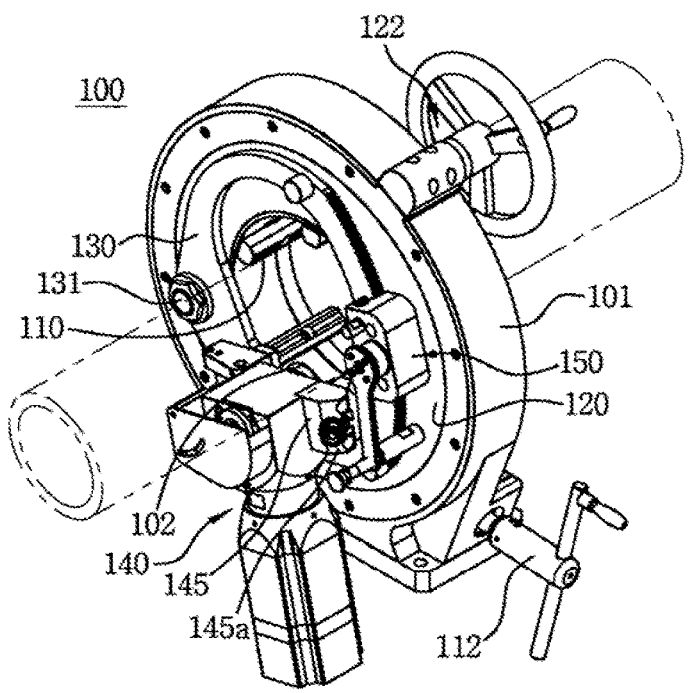
FIG. 3 is a general perspective view illustrating a dedicated pipe cutting and beveling machine according to the present disclosure.

Referring to FIG. 3, the pipe cutting and beveling machine 100 according to an aspect of the present disclosure includes a main body 101 that is vertically erected, as a basic skeleton. The main body 101 has a central portion through which a pipe p to be cut or beveled passes, machining means for cutting or beveling the pipe are coupled to the front side of the main body 101, and a fixing means for clamping the pipe is coupled to the rear side of the main body 101.

First, in the machining means, a rotary plate 120, which rotates about the fixed pipe p concentrically around the outer periphery of the fixed pipe p, is coupled to the main body 101. The rotary plate 120 is coupled to the main body 101 so as to be freely rotatable without being separated from the main body 101, and includes a rotation control unit 122 configured to selectively rotate the rotary plate 120 on either side of the main body 101.

Figure 4:
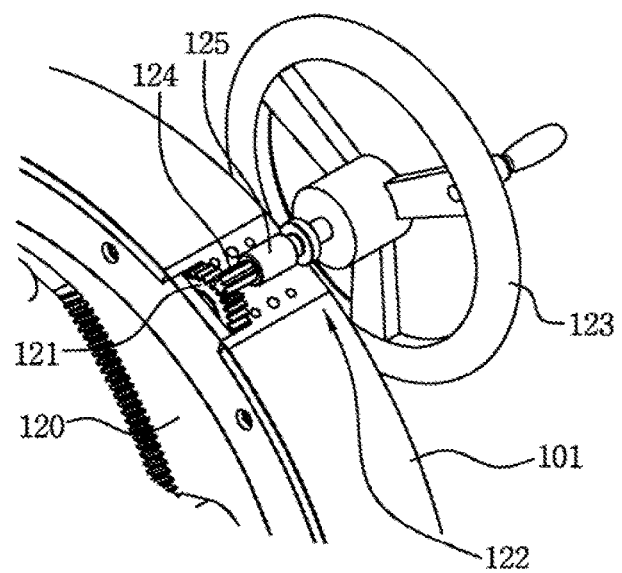
FIG. 4 is a view illustrating the inside of a rotation control unit according to the present disclosure in detail.

As can be seen from FIG. 4, the rotation control unit 122 has a handle 123 as a basic structure, and a rotary shaft 124 of the handle 123 is engaged with the rotary plate 120 through gears so as to rotate the rotary plate 120 in a desired direction and by a desired amount depending on the rotation of the handle 123. Therefore, gears engaged with each other are respectively formed on the circumferential surface of the rotary plate 120 and the rotary shaft 124 of the handle 123. More preferably, since the gear on the rotary shaft 124 cannot be directly engaged with the rotary plate 120, the connecting gear 121 is further configured to serve as a power transmission medium. The rotation control unit 122 may be constituted with a manual handle as illustrated in the drawing, or may be automatically rotated by a drive motor. In addition, the rotation control unit 122 may have a reverse rotation prevention unit 125 formed on the rotary shaft. The reverse rotation prevention unit 125 serves to prevent reverse rotation of the rotary plate 120 in the direction opposite to the pipe machining direction. The reverse rotation prevention unit 125 may be configured to be rotated in only one direction or may be configured to be rotated in both directions but to be capable of selecting a direction mode. Thus, the reverse rotation prevention unit 125 may be configured as a one-way clutch, a two-way clutch, or a ratchet type that can be easily implemented in the field of mechanical components.

Referring to FIG. 3 again, the entry adjustment plate 130 is coupled to the front side of the rotary plate 120, and the cutter unit 140 is in turn coupled to the entry adjustment plate 130. The entry adjustment plate 130 has a shape similar to a waxing moon (or a waning moon), and one side of the entry adjustment plate 130 is coupled to the rotary plate 120 via a hinge 131 so as to pivot. The pipe is disposed to pass through a penetration portion in the entry adjustment plate 130. The entry adjustment plate 130 pivots about the coupling portion of the hinge 131 so that the mounted cutter unit 140 is capable of entering toward or retreating from the cutting portion of the pipe. Therefore, an entry control unit 150 configured to selectively control the entry adjustment plate 130 to pivot about the coupling portion of the hinge 131 is provided on the rotary plate 120.

Figure 5:
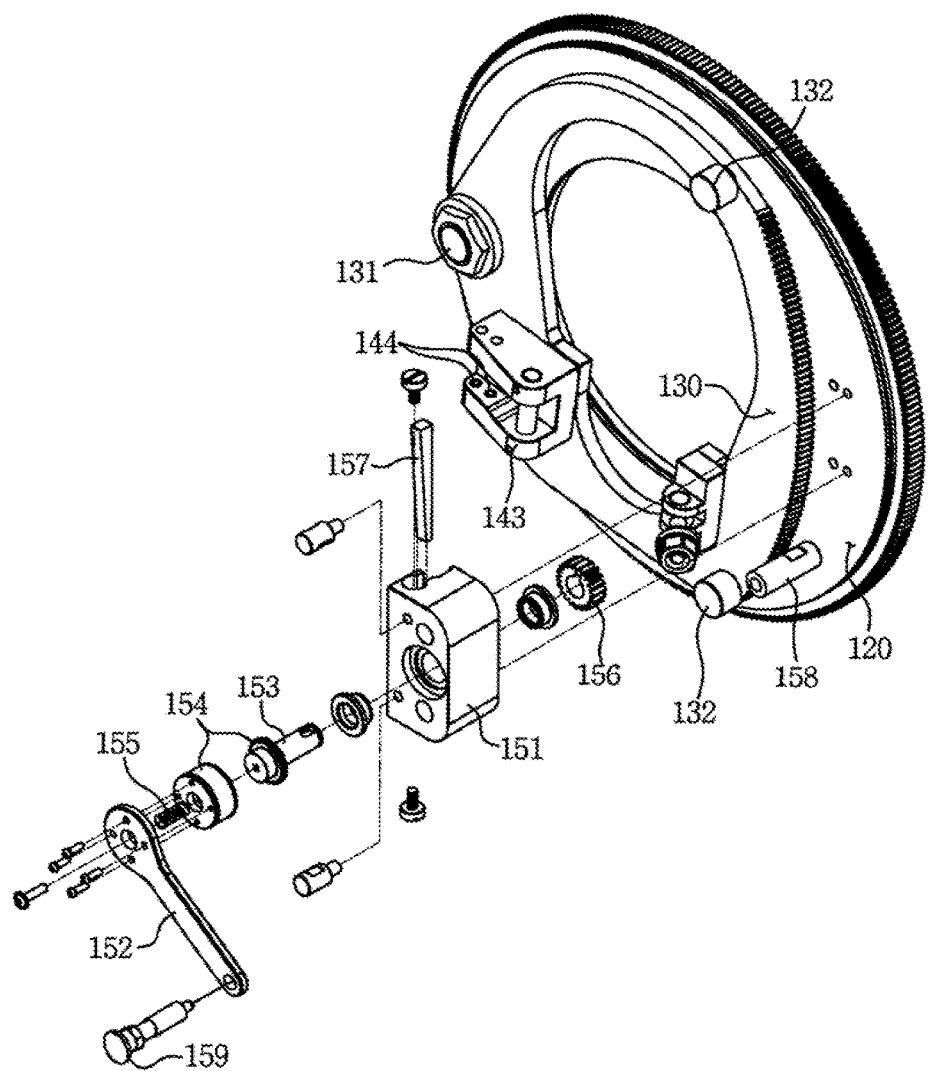
FIG. 5 is an exploded view for illustrating the structure of an entry control unit illustrated in FIG. 3.

Referring to FIG. 5, the entry control unit 150 includes a lever 152 configured to operate the entry and retreat. That is, a gear is formed on the outer surface of the entry adjustment plate 130, and a gear 156 engaged with the gear of the entry adjustment plate 130 is also provided at the end of the rotary shaft 153 of the lever 152. More preferably, the entire unit of the entry control unit 150 is coupled to a gear box 151 such that the gear box 151 is coupled to the rotary plate 120, and the gear 156 on the shaft of the lever 152 is engaged with the outer surface of the entry adjustment plate 130 through a gear, whereby the entry adjustment plate 130 is operated to enter or retreat within a predetermined range.

For the sake of convenience of the user, the present disclosure provides a method in which the entry adjustment plate 130 is finely movable by being restrained by the lever 152 and a method in which the entry adjustment plate 130 is freely and largely movable without being restrained by the lever 152. That is, when the lever 152 is lifted in the axial direction, the restraint with the entry adjustment plate 130 is released and the entry adjustment plate 130 is freely pivoted. When the lever 152 is released again, the entry adjustment plate 130 is restrained again by the action of the spring 155.

A clutch 154 is provided on the rotary shaft 153 of the lever 152 in order to restrain and release the lever 152 and the entry adjustment plate 130. The clutch 154 serves to disconnect or connect the power transmission by operation. The present disclosure has a structure in which an inner ring gear is formed on the lever 152 side and an outer ring gear is formed on the rotary shaft 153 side such that the power is connected when the inner and outer ring gears are engaged with each other and the power is interrupted when the inner and outer ring gears are not engaged with each other. In the embodiment and the drawings of the present disclosure, the inner and outer ring gears are proposed as for the clutch 154, but splines similar to the inner and outer ring gears may also be possible. Alternatively, it is also possible to implement the clutch in the form in which a dividing plate having a plurality of pinholes at regular intervals is provided on the side of the rotary shaft 153 or the lever 152 and the pins are coupled to the divided plate. In addition, a spring 155 may be interposed between the clutch 154 and the lever 152 such that the lever 152 can be elastically lowered when the lever 152 is released after the clutch 154 is interrupted by lifting the lever 152 in the axial direction.

Since the entry adjustment plate 130 according to the present disclosure is coupled by the hinge 131 coupling and the gear engagement of the entry control unit 150 without a separate fastening means, a clearance may be generated to such an extent as to affect the cutting machining of the cutter unit 140. Therefore, the entry control unit 150 according to the present disclosure is provided with a preload generation means such that the entry adjustment plate 130 has an appropriate clearance. That is, a portion of the outer surface of the entry adjustment plate 130 is inserted into the gear box 151 on the entry adjustment plate 130 side, and on the gear box 151 side, which is in contact with the side surface of the entry adjustment plate 130, a wedge 157 also called a base portion is inserted. Therefore, the adjustment screws may be pressed on the both ends of the wedge 157 so as to make the entry adjustment plate 130 have proper preload by the wedge 157.

On the other hand, the entry control unit 150 requires a retreat prevention means in order to prevent the cutter unit 140 from being repelled by cutting resistance when the cutter unit 140 cuts the pipe. Therefore, according to the present disclosure, the entry fixing pin 158 is provided at the lowermost (bottom dead point) position of the pivotal movement of the lever 152, and the lever 152 may be selectively fixed to the entry fixing pin 158. Therefore, a lever stopper 159 is provided at the end of the lever 152 so as to be inserted into the entry fixing pin 158. The lever stopper 159 can be constructed by mounting a universal index plunger 159. At this time, the length of the lever stopper 159 is longer than the interval at which the lever 152 is lifted or elastically lowered to be restrained and released from restraint, thereby preventing the lever stopper 159 from being disengaged from the entry fixing pin 158 by the axial movement of the lever 152.

Meanwhile, a stopper 132 is provided on the entry adjustment plate 130 such that the entry adjustment plate is movable within a predetermined range. The stopper 132 may be made of an elastic material so as to mitigate impact at the time of collision.

Figure 6:
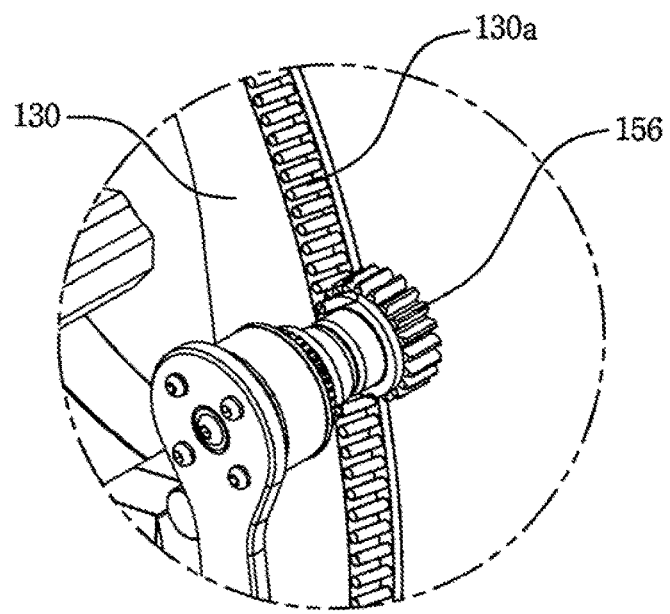
FIG. 6 is a view illustrating an embodiment of the entry adjustment plate illustrated in FIG. 5, which is modified in gear forming.

The entry adjustment plate 130 and the lever 152 according to the present disclosure are engaged with each other through gears, and thus a problem may occur in that pipe cutting chips are caught between these gears. When the cutting chips are caught between the gears, the operation of the entry control unit 150 is not smooth, and after a long time, the cutting chips adhere to be fixed between the gears, which may make the machine unusable. Therefore, in the present disclosure, as illustrated in FIG. 6, the gear of the entry adjustment plate 130 is formed of a pin gear 130a, so that the caught chips can be easily discharged. Alternatively, the gear may be formed of a helical gear so that the chips can be more easily discharged by a helical tilt angle.

Figure 7:
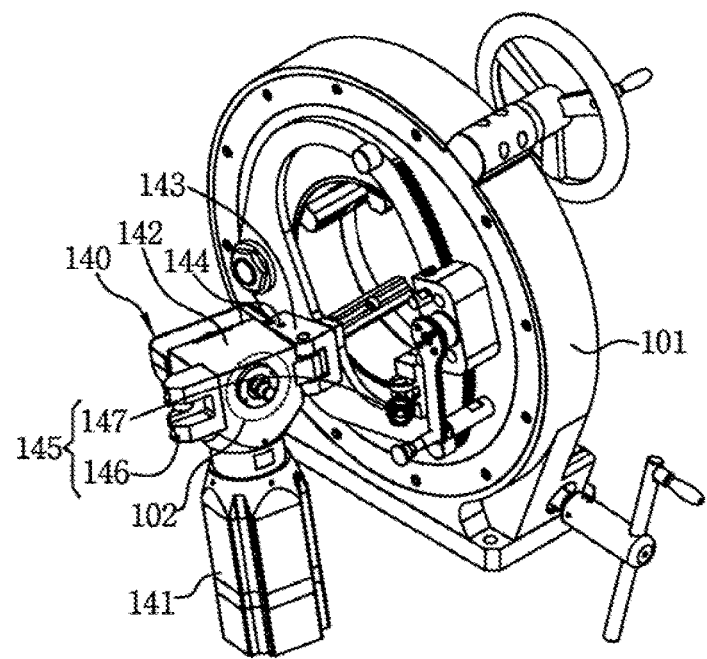
FIG. 7 is a view illustrating the state in which the cutter unit according to the present disclosure is tilted to one side.

Referring to FIGS. 3 and 7, the cutter unit 140 according to the present disclosure is coupled to the lower portion of the entry adjustment plate 130 halfway between the hinge 131 coupling portion and the entry control unit 150. The cutter unit 140 includes a drive motor 141 configured to generate cutting power, a transmission 142 configured to reduce or increase the rotational force of the drive motor 141, a pivot unit 143 provided on one side of the transmission 142, and a lock unit 145 provided on the transmission 142 opposite the pivot unit 143, and a cutting blade 102 (or a chamfering blade) for cutting a pipe is mounted on the output stage of the transmission 142.

In the present disclosure, the structure in which the cutter unit 140 is tilted laterally by the pivot unit 143 allows the cutting blade mounted on the output stage of the transmission 142 to be easily exposed to the outside, so that the cutting blade can be easily replaced. Therefore, the pivot unit 143 is pin-coupled, so that the cutter unit 140 can be freely tilted on the entry adjustment plate 130. A stopping ball 144 may be provided on the inner surface of the pivot unit 143 so as to temporarily stop the movement of the cutter unit 140 after the cutter unit 140 is tilted, so that machining tools can be easily attached and detached and a groove may be formed on the transmission 142 so as to be in contact with the stopping ball 144.

The lock unit 145 fixes the cutter unit 140 in position, and includes a latch 146 provided on the cutter unit 140 side and a fastening means 147 provided on the entry adjustment plate 130 side such that the fastening means 147 is inserted into the latch 146 side so as to stop the movement of the pivot unit 143 of the cutter unit 140. Preferably, a seating surface 145a of the latch 146 to be fastened by the fastening means 147 is formed to be inclined in an oblique direction such that when fixing the cutter unit 140, the fastening means 147 pushes the cutter unit 140 toward the pivot unit 143, so that the clearance of the cutter unit 140 can be minimized.

As illustrated, the fastening means 147 is implemented in a directly coupled nut type. However, the fastening means 147 may be implemented by various fastening means such as a lever type or a butterfly nut for fixing the cutter unit 140 to the entry adjustment plate 130.

Meanwhile, the cutter unit 140 may have two output stages. That is, as illustrated in the drawing, output stages may be provided on the rear side and the front side of the transmission 142, respectively, so as to improve the convenience of operation.

Figure 8:
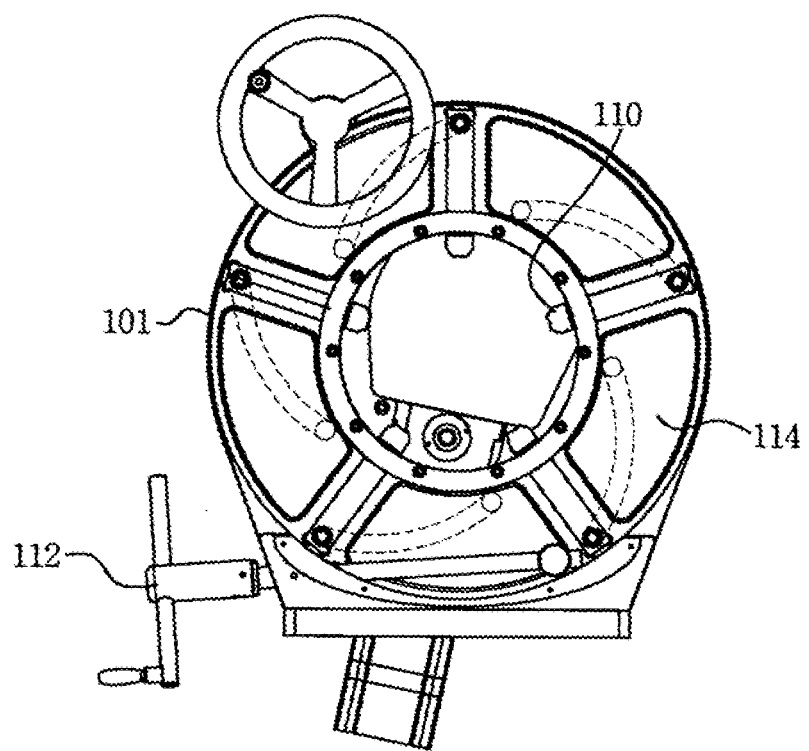
FIG. 8 is a view illustrating a coupling relationship between jaws and a clamping lever illustrated in FIG. 3.

Next, a fixing means for clamping a pipe to be cut will be described with reference to FIG. 8 in which the main body 101 is viewed from the rear side. The fixing means includes a clamping lever 112 formed at a lower portion of one side of the main body 101 and a plurality of jaws 110 mounted inside the rear portion of the main body 101 to convert the rotating motion of the clamping lever 112 into a linear reciprocating motion, thereby outputting the linear reciprocating motion. At this time, the rotating motion of the clamping lever 112 rotates a clamping assist plate 114 coupled to the rear side of the main body 101 in a predetermined section while pulling or pushing the clamping assist plate 114. Therefore, the reciprocating jaws 110 are coupled to the clamping assist plate 114 at regular intervals so as to be oriented toward the central portion and are guided by the main body 101 in an arc shape. Consequently, all the jaws 110 are configured to be moved radially inwards toward the pipe side or moved radially outwards.

Here, the axial end portion of the clamping lever 112 is screwed to a portion of the clamping assist plate 114 so as to pull or push the clamping assist plate 114. Since the coupled portion of the clamping assist plate 114 moves in the arc shape, the clamping lever 112 can be moved up and down. Therefore, a spherical bearing may be applied as a joint to the coupling portion of the clamping lever 112 and the main body 101.

Figure 9:
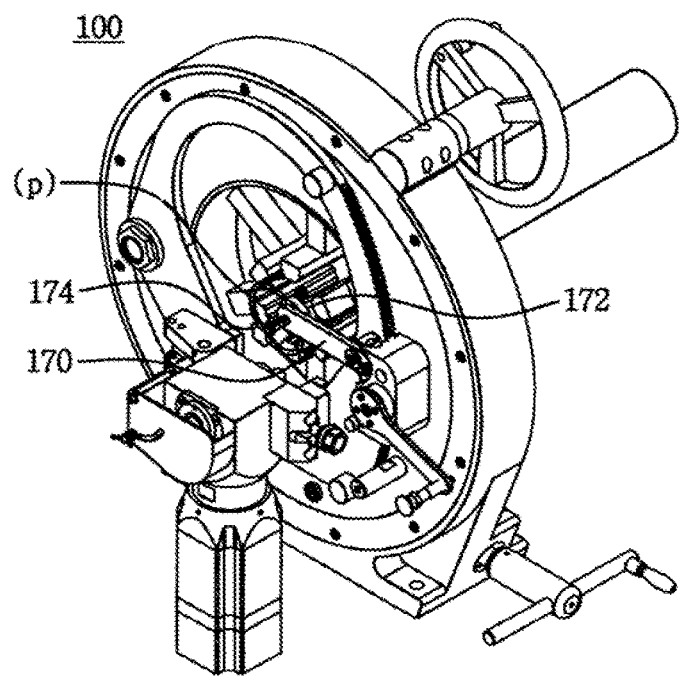
FIG. 9 is a view illustrating an embodiment of a beveling stopper according to the present disclosure.

Referring to FIG. 9, the pipe cutting and beveling machine 100 according to the present disclosure may be provided with a cutting position stopper 170 configured to precisely align the cutting point of the pipe p when cutting or beveling the pipe.

Figure 10:
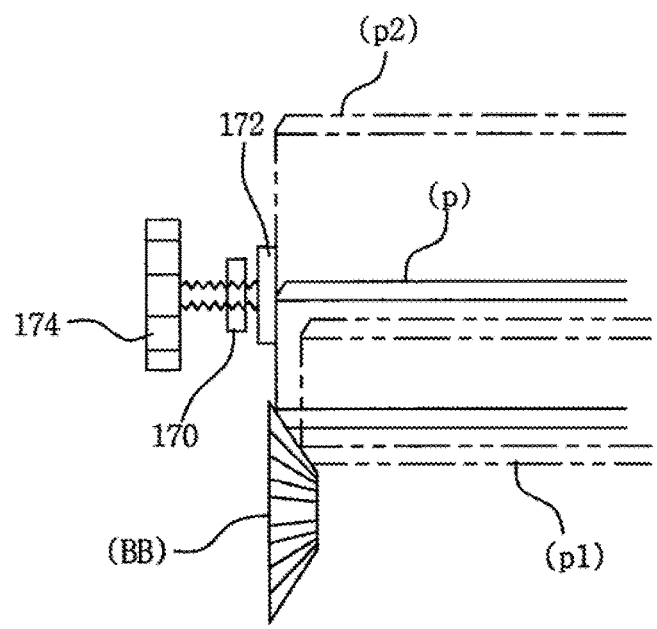
FIG. 10 is a view illustrating a relationship between a beveling stopper and a beveling cutting blade.

Cutting blades 102 in the pipe cutting and beveling machine 100 according to the present disclosure include a cutting blade CB for cutting as illustrated in FIG. 7 and a cutting blade for beveling (a beveling blade BB) as illustrated in FIG. 10, in which the cutting blade CB is a cutting blade for vertically cutting the pipe, and the beveling blade BB is a cutting blade for forming a welding-improving (beveled) surface on the cut surface of the pipe. The beveling blade is provided such that the edge portion thereof is inclined according to a predetermined angle. When the cut surface of the pipe is positioned on the edge portion, improvement work is performed on the cut surface of the pipe according to the angle of the beveling blade.

Therefore, before the beveling operation, it is necessary to push or draw out the pipe in order to make the position of the cut surface of the pipe aligned with the edge of the beveling blade. However, there is a limit in approximately adjusting the position with eye measurement. Further in the case of a heavy and long pipe, there is a problem in that it is difficult to move the pipe little by little by hand. Therefore, in the present disclosure, in order to improve the convenience of beveling operation, the cutting position stopper 170 is provided to cause the edge portion of the beveling blade to come into contact with the cut surface of the pipe member such that the position of the edge portion of the beveling blade and the position of the cut surface of the pipe member are precisely aligned with each other.

One end of the cutting position stopper 170 of the present disclosure is rotatably mounted to the gear box 151 of the entry control unit, and a stopper plate 172 to come into contact with the cut surface of the pipe p is coupled to the other end of the cutting position stopper 170. Although the cutting position stopper 170 is illustrated as being coupled to the gear box 151, the cutting position stopper 170 may be installed in the rotary plate 120, the entry adjustment plate 130, and the like, rather than in the gear box.

Preferably, the stopper plate 172 may be coupled by a stop adjuster 174 so as to more finely adjust the horizontal movement position of the pipe p. As illustrated in FIG. 10, the fine adjustment of the stopper plate 172 has an advantageous effect of adjusting the positions of cut surfaces of the pipe so as to be uniformly distributed below and above the edge portion of the beveling blade. That is, the edge portion of the beveling blade has an area significantly larger than the thickness of the pipe. When the cut is limited to only one location, the edge portion in that location is worn away. Therefore, as illustrated in the drawing, when working is performed with the lower side of the edge portion, the working may be performed in the state in which the pipe is laid at position p1, and when working is performed with the upper side of the edge portion, the working may be performed in the state in which the pipe is laid at position p2. Alternatively, in addition to the even distribution of the edge portion, adjustment of the stopper plate 172 is also required in order to adjust the beveling depth according to the thickness of the pipe or the like.

Figure 11:
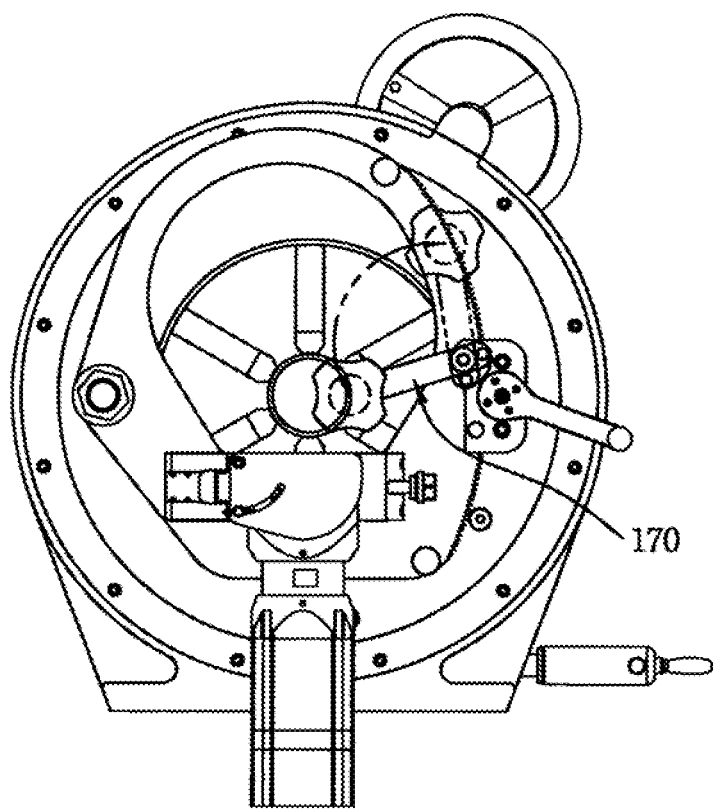
FIG. 11 is a view illustrating a rotation movement of the beveling stopper.

More preferably, the cutting position stopper 170 has a structure that can be pivoted as illustrated in FIG. 11, so that the cutting position stopper 170 may be turned inward only when the cut surface of the pipe is positioned. Since the work may be interrupted by the cutting position stopper 170, the cutting position stopper 170 may normally be placed outside. Further, for a large pipe like the pipe p2 in FIG. 10, it is necessary to rotate the cutting position stopper 170 further outwards than a small pipe in order to bring the cutting position stopper 170 into contact with the pipe. At this time, it may be more preferable that the cutting position stopper 170 is constituted with a ball plunger such that the rotation movement of the cutting position stopper 170 has predetermined dived angles.

The cutting position stopper 170 according to the present disclosure is capable of playing an important role in positioning the pipe not only in the beveling operation, but also in the cutting operation. That is, when the cutting position stopper 170 is placed on the outside of the pipe, the end of the stopper plate 172 becomes the cutting position. Therefore, the cutting position can be determined in advance using the stopper plate 172, which makes it possible to perform a more precise and convenient cutting operation.

While descriptions have been made with reference to the embodiments of the present disclosure, a person ordinarily skilled in the art can understand that the present disclosure may be variously modified and changed without departing from the technical idea and scope of the present disclosure.

The invention claimed is:

1. A pipe cutting and beveling machine comprising:
   a main body portion having a central portion through which a pipe passes so as to be fixed;
   a cutter unit coupled to the main body portion and configured to cut or bevel the pipe via a cutting blade while the cutter unit is orbiting around the fixed pipe;
   an entry adjustment plate coupled to the cutter unit and configured such that the entry adjustment plate and the cutter unit move toward and retreat from a portion of the pipe at which the cutting blade is configured to cut the pipe, which moving and retreating are movements along a path extending in a direction; and
   an entry control unit configured to perform the moving of the entry adjustment plate,
   wherein the cutter unit is provided with a pivot unit on one side thereof such that the cutter unit is pivoted about a pivot axis of the pivot unit back and forth along a path extending in a direction different from the direction of movement of the entry adjustment plate, and the cutter unit is provided with a lock unit on a side of the cutter unit that is opposite the pivot axis such that the pivoting of the cutter unit about the pivot axis is configured to pivot a portion of the lock unit that is mounted on the cutter unit into a locked position at which the lock unit restrains the pivoting of the cutter unit, and to pivot the portion of the lock unit away from the locked position when the lock unit releases the pivoting of the cutter unit.

2. The pipe cutting and beveling machine of claim 1, wherein the pivot unit is provided with a stop ball configured to temporarily stop movement of the cutter unit when the cutter unit is pivoted about the pivot axis towards the locked position, and wherein the portion of the lock unit that is mounted on the cutter unit is a latch having an upper surface that is formed to be inclined such that a fastening means of the lock unit pushes the cutter unit not only in a fastening direction, but also toward the pivot unit.

3. The pipe cutting and beveling machine of claim 1, wherein the entry control unit comprises a lever engaged with an outer surface of the entry adjustment plate via gears and a clutch that are provided on a rotary shaft of the lever so as to be released from restraint when the lever is lifted or pushed in a direction.

4. The pipe cutting and beveling machine of claim 3, wherein units of the entry control unit are coupled to a gear box, a wedge is coupled to the gear box such that the wedge is adjustable in depth, and a spring is embedded in the clutch so as to allow the lever to be elastically lowered.

5. The pipe cutting and beveling machine of claim 3, wherein the outer surface of the entry adjustment plate, which outer surface is engaged with the lever via the gears, is provided with a pin gear.

6. The pipe cutting and beveling machine of claim 1, wherein the entry control unit is provided with a cutting position stopper that is rotated toward a cutting position of the pipe in order to set a cutting or beveling point of the pipe.

7. The pipe cutting and beveling machine of claim 6, wherein the cutting position stopper is further provided with: (i) a stopper plate and (ii) a stop adjuster so as to finely adjust the cutting point of the pipe.

* * * * *